March 20, 1928.
A. W. MUELLER
1,662,890
CUTTING MACHINE
Filed May 19, 1925    3 Sheets-Sheet 1
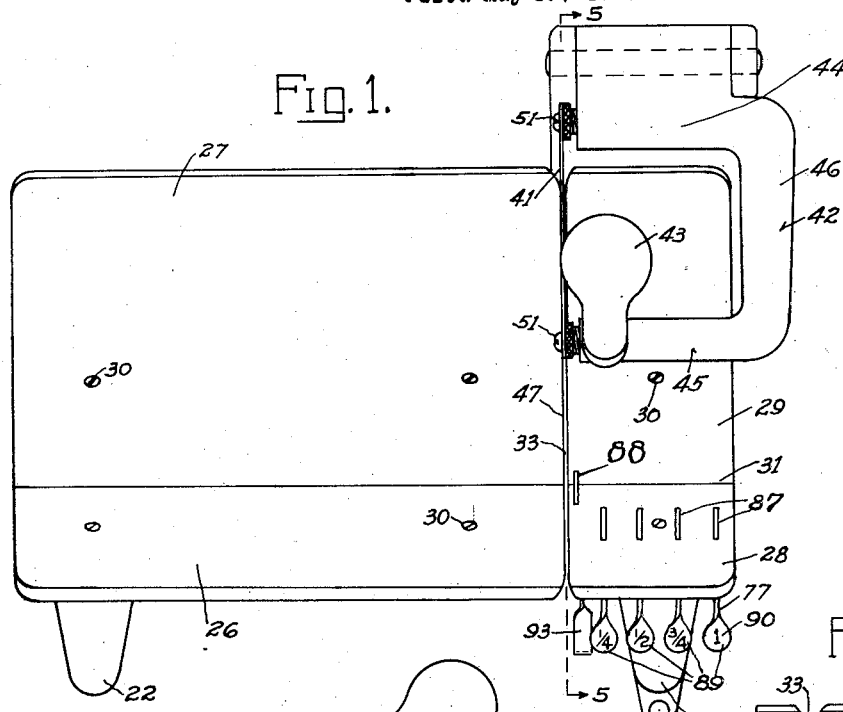
Fig. 1.
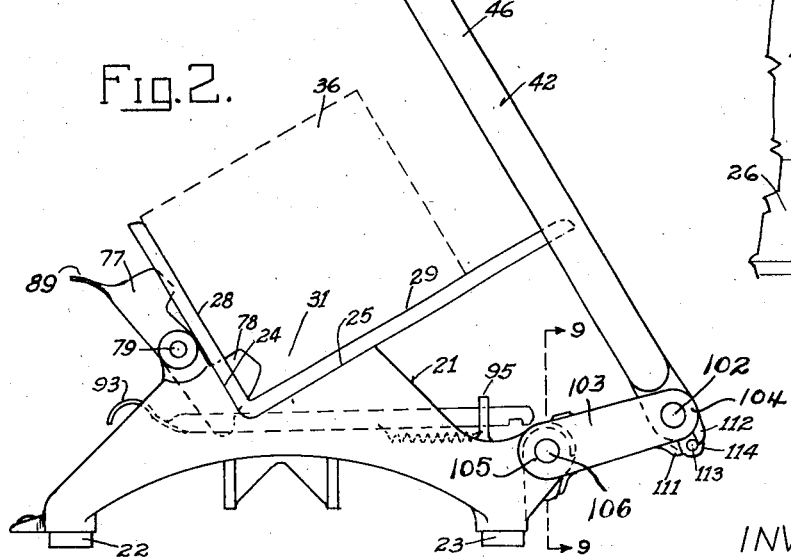
Fig. 2.
Fig. 3.
INVENTOR

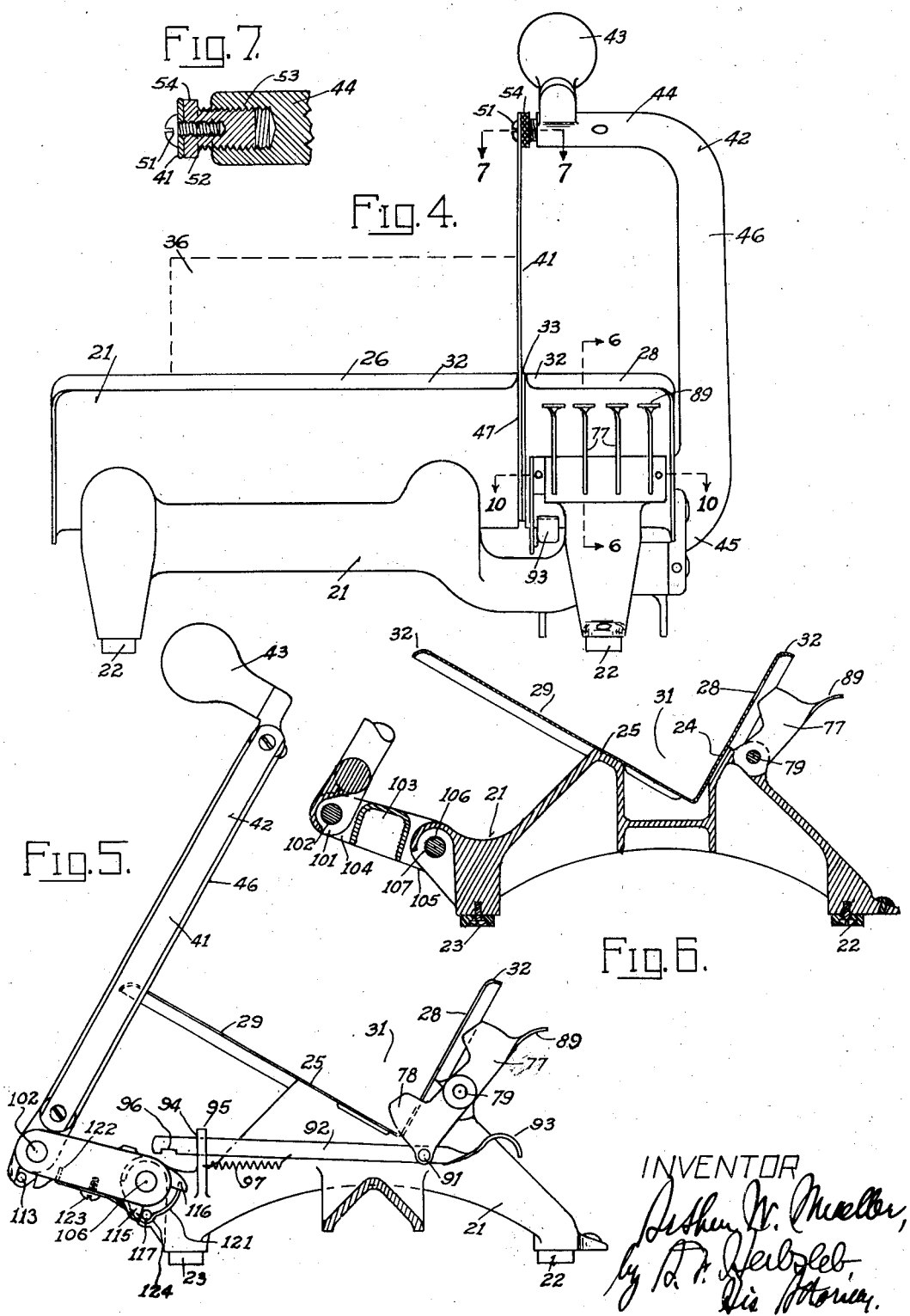

March 20, 1928.
A. W. MUELLER
1,662,890
CUTTING MACHINE
Filed May 19, 1925
3 Sheets-Sheet 3
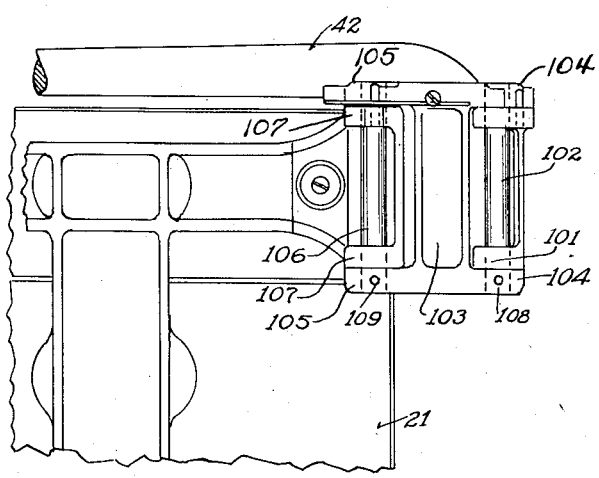
Fig.8.
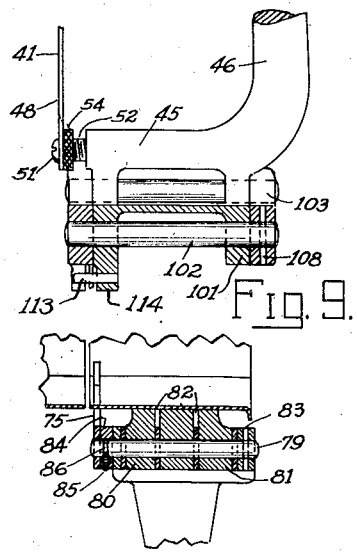
Fig.9.
Fig.10.
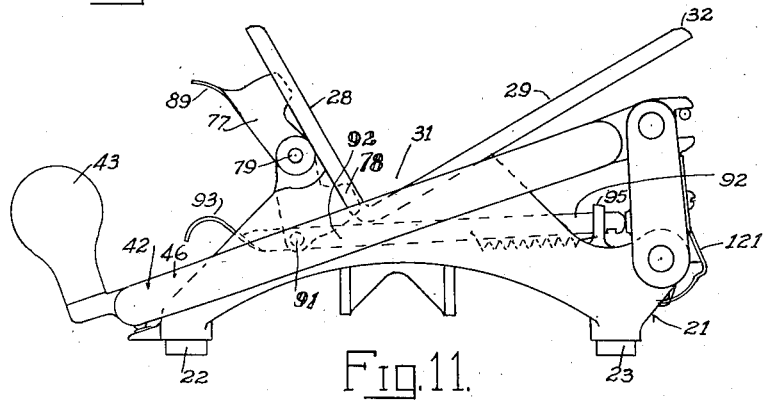
Fig.11.
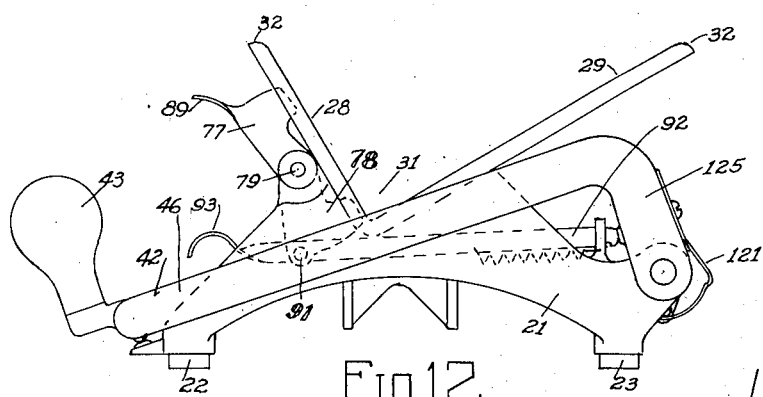
Fig.12.
INVENTOR
Arthur W. Mueller,
by R. P. [signature]
His Attorney.

Patented Mar. 20, 1928.

1,662,890

UNITED STATES PATENT OFFICE.

ARTHUR W. MUELLER, OF CINCINNATI, OHIO.

CUTTING MACHINE.

Application filed May 19, 1925. Serial No. 31,384.

My improved device is especially adapted for cutting cheese and similar substances.

The cheese to be cut is usually in the form of so-called bricks of cheese which in practice weigh five pounds each, and are usually eleven inches long and three and seven-sixteenths inches square, some of the cheese being in practice three and one-fourth inches in thickness and three and three-quarter inches in width, while still other bricks of cheese or so-called flat cheeses are usually two and one-half inches thick by five inches wide and ten inches long. These dimensions are given as exemplifications and for a clearer understanding of parts of the invention.

The machine is intended for use in retail stores for selling sections or slices cut from the bricks of cheese or for cutting slices of cheese for use in sandwiches, such last-named slices to be of so-called sandwich thickness.

Cheese of this kind is usually covered with tin foil and is usually comparatively soft and sticky, although in instances it is hard and brittle, and difficulty has been experienced heretofore in the successful cutting of the cheese.

It is the object of my invention to provide novel means whereby to successfully cut the cheese, and further to successfully cut through the covering of tin foil or other covering about the cheese in such manner that the tin foil or other covering may be sliced with the cheese and form a covering for the edge of the slice.

It is the object of my invention further to provide gaging means for gaging the sizes of the sections or slices cut from the various sizes of bricks of cheese.

It is the object of my invention further to provide means for mounting the knife-blade, and whereby to move the knife-blade in combined paths which include arcuate and lengthwise movements of the knife-blade; further, to provide novel means for moving the knife-blade across the cheese in such manner that ready severance of the section or slice of cheese may be had.

The invention will be further readily understood from the following description and claims, and from the drawings, in which latter:

Fig. 1 is a plan view of my improved device, with the cutting means in retracted position.

Fig. 2 is an end elevation of the same.

Fig. 3 is a plan view of the gage end of the trough, the pivotal frames being omitted for better illustration of the gages.

Fig. 4 is a front elevation of my improved device.

Fig. 5 is a vertical cross-section of the same, taken on the line 5—5 of Fig. 1.

Fig. 6 is a cross-section of the same, taken on the line 6—6 of Fig. 4, partly broken away.

Fig. 7 is a detail of the knife securing means, shown in section on the line 7—7 of Fig. 4.

Fig. 8 is a bottom view of my improved device, partly broken away, and showing the knife end of the machine.

Fig. 9 is a vertical sectional detail of the same, taken on the line 9—9 of Fig. 2.

Fig. 10 is a horizontal cross-section, taken on the line 10—10 of Fig. 4, showing the means for mounting the gages.

Fig. 11 is an end view of my improved device, showing the knife-lever in down position; and, Fig. 12 is an end view of my improved device, showing a modification of the knife-lever.

A suitable frame 21 is provided with feet 22, 23, and with angle faces 24, 25. Plates 26, 27 and 28, 29, are secured to these angle faces, as by screws 30, and form the walls of a trough 31 in which the material is arranged to be placed. The plates preferably have down-turned edges 32 for providing a finished appearance and strengthening the plates. A knife-slot 33 is provided between the proximate ends of the plates.

The material, exemplified as a brick of cheese 36, is arranged to be received in the trough. The walls of the trough are located at substantial right angles with respect to each other, with the angle between said walls presented downwardly, that is, the vertex of the angle is in lowermost position.

A knife-blade 41 is mounted in a knife-frame 42, the latter provided with a handle 43 for manipulation of the same. The knife-frame preferably extends in upward and forward direction when in normal retracted position. It is shown of bowed form, having laterally extending arms 44, 45, between which there is a connecting arm 46, which is arranged to swing past the outer end of the cutting portion of the material trough.

The wall 47 of the knife-slot forms a cutting edge, with which the knife-blade coacts for cutting the material. The knife-blade is exemplified (see Fig. 9), as having a cutting edge 48 which tapers toward one side of the knife-blade, for coacting with the cutting edge of the wall of the knife-slot. The slanting face of the cutting edge of the knife-blade extends solely away from the body of the material being cut and moves the cut portion away from said body, for ready passage of the knife through the material, and for preventing crushing of the material by the knife-blade.

The knife-blade is preferably adjustable laterally, being shown adjustable on the knife-frame, as by mounting the same at its respective ends on screws 51, which are threaded in sleeves 52, the sleeves being in turn threaded in threaded sockets 53 in the respective laterally extending arms of the knife-frame. The sleeves are adjustable in the laterally extending arms for laterally positioning the knife-blade, and the screws 51, received through said knife-blade, clamp the knife-blade to the sleeves, whereby the knife-blade is firmly secured in adjusted positions to the knife-frame. The sleeve may be provided with a head 54 for ready turning of the same.

The material trough has a material supporting portion for the body of the material at one side of the knife-slot, and a material gaging portion at the other side of the knife-slot. The inner faces of the walls of the gaging portion of the material trough are preferably provided with suitable indications.

Gages are preferably provided on each of the walls of the trough, so that the cheese may be properly squared up in the trough as, when cheese is soft, it is likely to shift in lengthwise directions at different portions of its cross-section. I also prefer to provide the walls of the trough with a plurality of gages for the respective sizes of the cheese.

Thus I have provided the inner face of the wall 28 with a gage 61, and the inner face of the wall 29 of the trough with gages 62, 63, 64. The gages 61, 63, are applicable for the substantially square bricks of cheese of eleven inch length, and the gages 62, 64, for the so-called flat cheese of ten inch length. These gages are respectively divided into primary divisions of one-fourth, one-half, three-fourths and one pound, representing weights. The inner faces of said walls may also have gages 66, 67, for the respective lengths of cheeses, on a price basis, each division representing a unit of value, for instance five cents, or they may represent divisions of a tenth of a pound each. Further gages 68 are also preferably provided, representng a sandwich thickness of cheese.

Stops are preferably provided for the main divisions, namely, one-fourth, one-half, three-fourths and one pound, shown as stops 71, 72, 73, 74, and for the sandwich thickness, exemplified as the stop 75. The stops 71, 72, 73, 74, are arranged primarily for the substantially square cheeses which are eleven inches long, which represent the majority of cheeses. In selling cheeses ten inches long the same stops may be used with slight space between the end of the cheese and said stops as determined by the gauges 62, 64.

These stops are located on arms. The stops 71, 72, 73, 74, are represented on arms 77, in the form of plates, and the stop 75 on an arm 78. The arms are pivoted at their proximate ends about a shaft 79, fixed in bearings 80, 81, on the frame having grooves 82 between them in which the arms are located. The shaft is fixed to the frame by a pin 83, and the arm 78 has a hub 84 in which there is a screw 85 received in a slot 86 in the shaft for positioning said arm endwise but permitting it to swing. The stops 71, 72, 73, 74, are arranged to project through slots 87, and the stop 75 is arranged to project through a slot 88, these slots being formed in the front wall of the trough. The stops are normally retracted from the inside of the trough, and are arranged to be projected into the trough in obstructing relation to the material, when it is desired to measure a piece of material to be cut.

The arms 77 are provided with handles 89 at the outside of the trough, by means of which the arms may be manipulated. The handles may be provided with gauge designations 90, corresponding with the measurements which they respectively serve.

The arm 78 is articulated at 91 with a link 92, which has a handle 93 at its front end. This link is lengthwise movable in a slot 94 in a lug 95 at the rear portion of the frame. The link is provided with a notch 96 arranged to form a seat on said lug, so as to position the stop-arm 78 in retracted position. The arm is normally urged into obstructing relation by means of a spring 97, the respective ends of which are secured to said link and to said lug. When the notch is released from the lug by manipulation of the handle at the forward end of the link, the spring urges the stop-arm for sandwich thickness of cheese into the obstructing relation.

The knife-frame is preferably mounted in such manner as to be normally in retracted position, represented as an upwardly and forwardly extending direction, and the knife-lever is pivoted at its lower end to the frame in such manner that coaction between the knife-blade and the cheese may be had by a downward movement of the knife-blade, whereby the knife-blade is moved in an arc and also in lengthwise direction, for producing a shear cut upon the cheese, and a shear cutting action between the knife-blade and the knife-edge of the knife-slot.

Thus the lower end of the knife-frame may be provided with a pivot-lug 101, through which a pivot-pin 102 is received. A pivot-block 103 is preferably located between the lower end of the knife-frame and the frame of the machine. This pivot-block has pivot-lugs 104, through which the pivot-pin 102 is also received, for pivoting the knife-frame on the pivot-block. (See Fig. 8.) The pivot-block is pivoted to the main frame, being shown provided with pivot-lugs 105 through which a pivot-pin 106 is received, this latter pivot-pin also being received through pivot-lugs 107 extending from the main frame, in which latter lugs the pivot-pin is journaled.

The pivot-block is preferably secured to the respective pivot-pins, as by means of fastening pins 108, 109, for holding the pivot-pins in position.

Means are provided for limiting the relative pivotal movements between the knife-frame, the pivot-block and the main frame. Thus the pivot-block is provided with spaced-apart lugs 111, 112, between which a pin 113 on a lug 114 of the knife-frame is arranged to have limited lateral movement. The other end of the pivot-block is provided with spaced-apart lugs 115, 116, and the frame with a pin 117, between said last-named lugs, for limiting the swinging movements of the pivot-block with relation to the main frame.

The knife-frame and the pivot-block form a knife-lever which is pivoted below the plane of the rear slanting wall of the material trough, and in substantially the horizontal plane in which the vertex of the angle between the walls of the material trough is located, both the pivots being shown in substantially such location, with the pivot on the frame located below said vertex.

When manipulating the knife, the attendant or salesman grasps the handle 43 and swings the knife-lever forwardly, whereby the knife moves in an arc and also in lengthwise direction, owing to the manner in which it is pivoted relative to the material, for imparting a shear-cut to the material.

The pivot connections also permit lengthwise reciprocating movement of the knife upon contact with the cheese, or the covering of the cheese, for aiding in penetrating the same. This reciprocating lengthwise movement of the knife may continue throughout the cutting of the material, whereby ready cutting of the material is produced with minimum danger of injuring the slices being cut. When the knife-blade has been moved in its arcuate and lengthwise movement for completely severing the material being cut, the normal upper end of the knife-frame will be in down position, with the knife completely passed through the material compartment in the trough.

Means are preferably provided for normally maintaining the knife-lever in raised position, exemplified as a spring 121, fixed to the pivot-block, as by having an end thereof received in a hole 122 in the pivot-block and having a screw 123 clamp the spring to the pivot-block, (see Fig. 5), the spring having a recess 124, in which the pin 117 is received when the knife-lever is in retracted position, for holding the knife-lever in retracted position. The other end of the spring rides on and bears against the pin 117 during movements of the pivot-block. The extreme end of the spring is received alongside of the lug 116. The lugs 115, 116, coact with the pin 117, which extends from the frame, for limiting swinging movements of the pivot-block.

If desired, the intermediate articulation between the knife-frame and the pivot-block may be dispensed with, for instance, as exemplified in Fig. 12, in which case the knife is preferably provided at its lower end with a forward projection 125, provided at its lower forward end with pivot connections and articulation with the main frame, similar to the pivot connections and articulation between the pivot-block and said main frame, and similar spring means may be employed for normally maintaining the knife-lever in raised position.

Having thus fully described my invention, what I claim as new, and desire to secure by Letters Patent, is:

1. In a cutting machine of the character described, the combination of a frame, a material supporting trough comprising a sloping front wall and a sloping rear wall, said walls extending at substantially right angles to each other, means for supporting said trough on said frame with the angle between said walls presented downwardly, a knife-lever, a rigid knife-blade thereon, and a pivot for said knife-lever in substantially the horizontal plane of the vertex of said angle between said walls, said knife-lever and said knife-blade spaced laterally in upward direction from said pivot when said knife-lever and said knife-blade are in retracted positions, and constructed and arranged whereby combined swinging and transverse movements are imparted to said knife-blade with relation to said trough upon movement of said knife-blade across said trough.

2. In a cutting machine of the character described, the combination of a frame, a material supporting trough comprising a slanting front wall and a slanting rear wall, said walls extending at substantial right angles to each other, means for supporting said trough on said frame with the angle between said walls presented downwardly, a knife-lever, a knife-blade thereon, a pivot for said knife-lever in substantially the horizontal plane of the vertex of said angle between said walls, said knife-blade spaced laterally in upward and rearward direction from said pivot when said knife-blade is in retracted position, and means for supporting said knife-blade in retracted position with said knife-blade extending upwardly and forwardly and clear of the material containing portion of said trough, and constructed and arranged whereby combined swinging and lengthwise movements are imparted to said knife-blade upon movement of said knife-blade across said trough.

3. In a cutting machine of the character described, the combination of a frame, a trough therein arranged to contain the material to be cut, said trough comprising a slanting bottom wall, a knife-frame, a knife-blade thereon, and a pivot-block between said knife-frame and said first-named frame, said pivot-block pivoted to both said frames by a plurality of pivots located below the plane of said slanting bottom wall of said trough when said lever is in retracted position.

4. In a cutting machine of the character described, the combination of a frame, a trough comprising coacting slanting walls extending at substantial right angles to each other, means for supporting said trough on said frame with the angle between said walls presented downwardly, knife supporting means, a knife-blade thereon, a pivot between said knife-supporting means and said frame for pivoting said knife supporting means to said frame, with said knife-blade extending in upward and forward direction at substantial right angles to the rear one of said slanting walls and spaced upwardly and rearwardly from said pivot, when in normal retracted position, and constructed and arranged whereby said knife is moved from said normal position with a forward and downward movement and the forward tipping of said knife supporting means moves said knife in a path which is arcuate and in which said knife has lengthwise movement.

5. In a cutting machine of the character described, the combination of a frame, a trough comprising a front wall and a rear wall at substantial right angles to each other, means for fixing said trough to said frame with the angle between said walls presented downwardly, a knife-frame, a link-frame between said knife-frame and said first-named frame, and articulations between said frames whereby said link-frame is pivoted to said first-named frame and said knife-frame is pivoted to said link-frame, said pivots being below the plane of said rear wall of said trough, and constructed and arranged whereby swinging movement of said knife-frame is permitted on said link-frame and pivotal movement is permitted said link-frame on said first-named frame, whereby movements in substantially lengthwise directions may be imparted to said knife.

6. In a cutting machine of the character described, the combination of a frame, a trough comprising a front wall and a rear wall at substantial right angles to each other, means for fixing said trough to said frame with the angle between said walls presented downwardly, a knife-frame, a link-frame between said knife-frame and said first-named frame, articulations between said frames whereby said link-frame is pivoted to said first-named frame and said knife-frame is pivoted to said link-frame, said pivots being below the plane of said rear wall of said trough, and constructed and arranged whereby swinging movement of said knife-frame is permitted on said link-frame, and pivotal movement is permitted said link-frame on said first-named frame, whereby movements in substantially axial directions may be imparted to said knife, and stops limiting said swinging movements of said knife-frame on said link-frame and of said link-frame on said first-named frame.

7. In a cutting machine of the character described, the combination of a frame, a trough for material to be cut comprising a slanting front wall and a slanting rear wall, said walls extending at substantial right angles to each other, means securing said trough to said frame with the angle of said trough presented downwardly, a link-frame having articulation with said first-named frame, a knife-frame having articulation with said link-frame, said knife-frame normally positioned at substantially right angles to said rear wall when in retracted position, and means comprising spaced-apart lugs and stops therebetween at the articulated portions of said frames for limiting swinging movements of said knife-frame and said link-frame with relation to each other and to said first-named frame, and constructed and arranged whereby said knife-frame may have axial movements imparted thereto for pivotal movements of said link-frame.

8. In a cutting machine of the character described, the combination of a frame, a trough comprising a front slanting wall and a rear slanting wall arranged at substantially right angles to each other, means securing said trough to said frame with the angle of said trough presented downwardly, said trough provided with a knife-slot the wall of which forms a cutting edge, a normally retracted swinging knife means coacting with said trough and comprising a knife-blade movable in said knife-slot crosswise of said cutting edge, said trough forming a material support at one side of said knife-slot and a measuring support at the other side of said knife-slot, and gauge marks which are complemental to each other on the inner faces of said respective walls in said measuring portion of said trough for gauging the material being cut.

9. In a cutting machine of the character described, the combination of a trough comprising a slanting front wall and a slanting rear wall arranged at substantially right angles to each other, a frame, means for securing said trough to said frame with the angle of said trough presented downwardly, said trough provided with a knife-slot, said trough at one side of said knife-slot arranged for receiving the material to be cut, and stops at the other side of said knife-slot for the end of the material received across said slot for determining unit values of the material to be cut, a knife-frame, a knife in said knife-frame cooperating with the wall of said knife-slot, and pivots for said stops in front of said front wall, said front wall provided with slots, and said stops arranged to project through said slots into the plane of the material in said trough.

10. In a cutting machine of the character described, the combination of a trough comprising a slanting front wall and a slanting rear wall arranged at substantial right angles to each other, a frame, means for securing said trough to said frame with the angle of said trough presented downwardly, said trough provided with a knife-slot, said trough at one side of said knife-slot arranged for receiving the material to be cut, a stop at the other side of said knife-slot for the end of the material received across said knife-slot, a knife-frame, a knife in said knife-frame cooperating with the wall of said knife-slot, said wall of said trough provided with a stop-slot, said stop arranged to project past said wall of said stop-slot into the space in the inside of said trough, a link having connection with said stop, means normally urging said stop into the interior of said trough, said link provided with a handle, and positioning means for said link whereby to position said stop outside said interior of said trough.

11. In a cutting machine of the character described, the combination of a trough comprising a slanting front wall and a slanting rear wall arranged at substantial right angles to each other, a frame, means for securing said trough to said frame with the angle of said trough presented downwardly, said trough provided with a knife-slot, said trough at one side of said knife-slot arranged for receiving the material to be cut, a knife-frame, a knife in said knife-frame cooperating with the wall of said knife-slot for cutting off pieces of the material, the said trough at the other side of said knife-slot provided with stop-slots, and stop-levers projected in opposite directions and having pivoting means at their proximate ends, said stop-levers provided with stops for the material fed past said knife-slot, and said stop-levers provided with manipulating means whereby to move the stops on said respective stop-levers through said stop-slots into the path of the material in said trough.

In testimony whereof, I have hereunto signed my name.

ARTHUR W. MUELLER.